Aug. 16, 1932.  R. H. WHITE  1,872,541
TRANSMISSION AND STEERING MECHANISM
Filed April 19, 1930   4 Sheets-Sheet 4

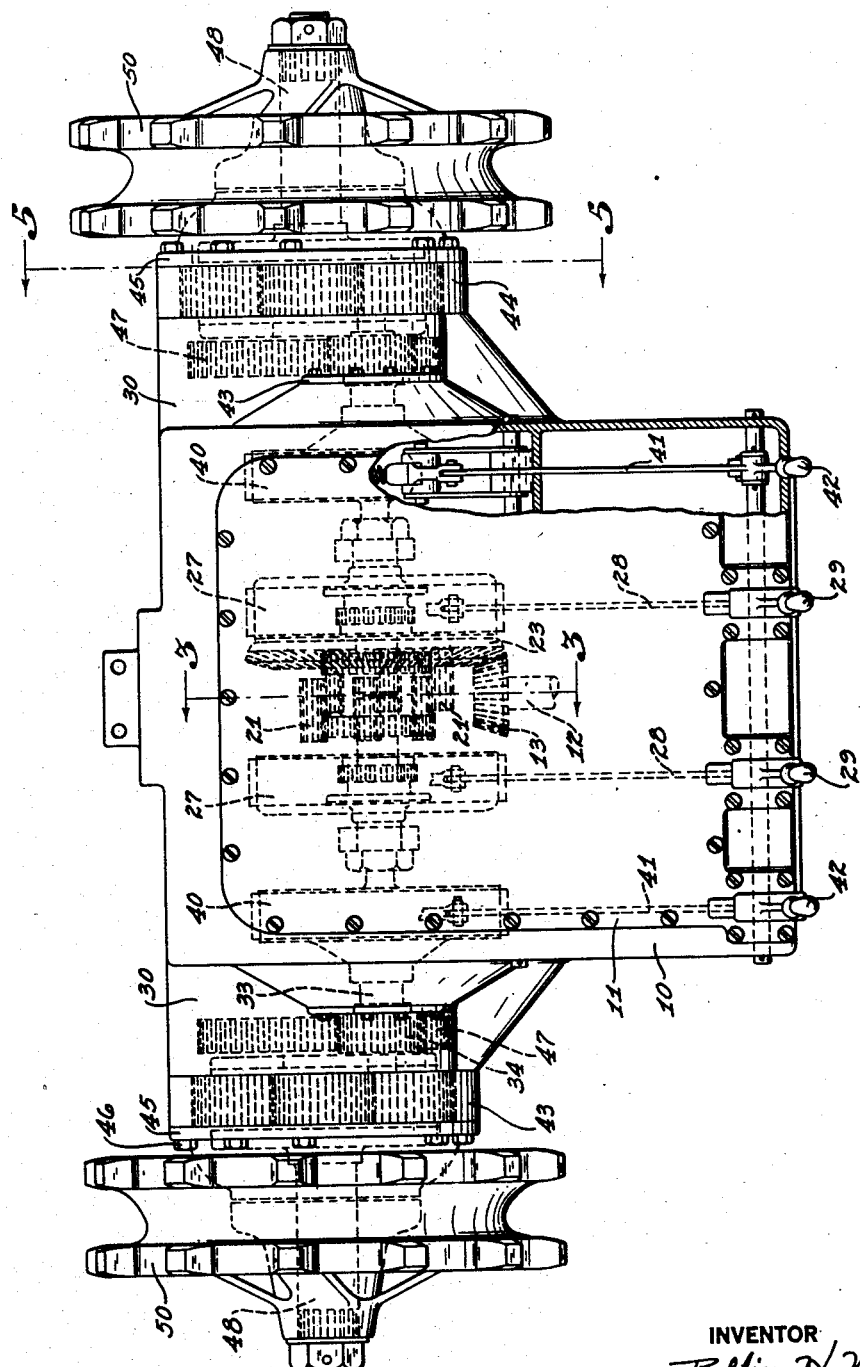

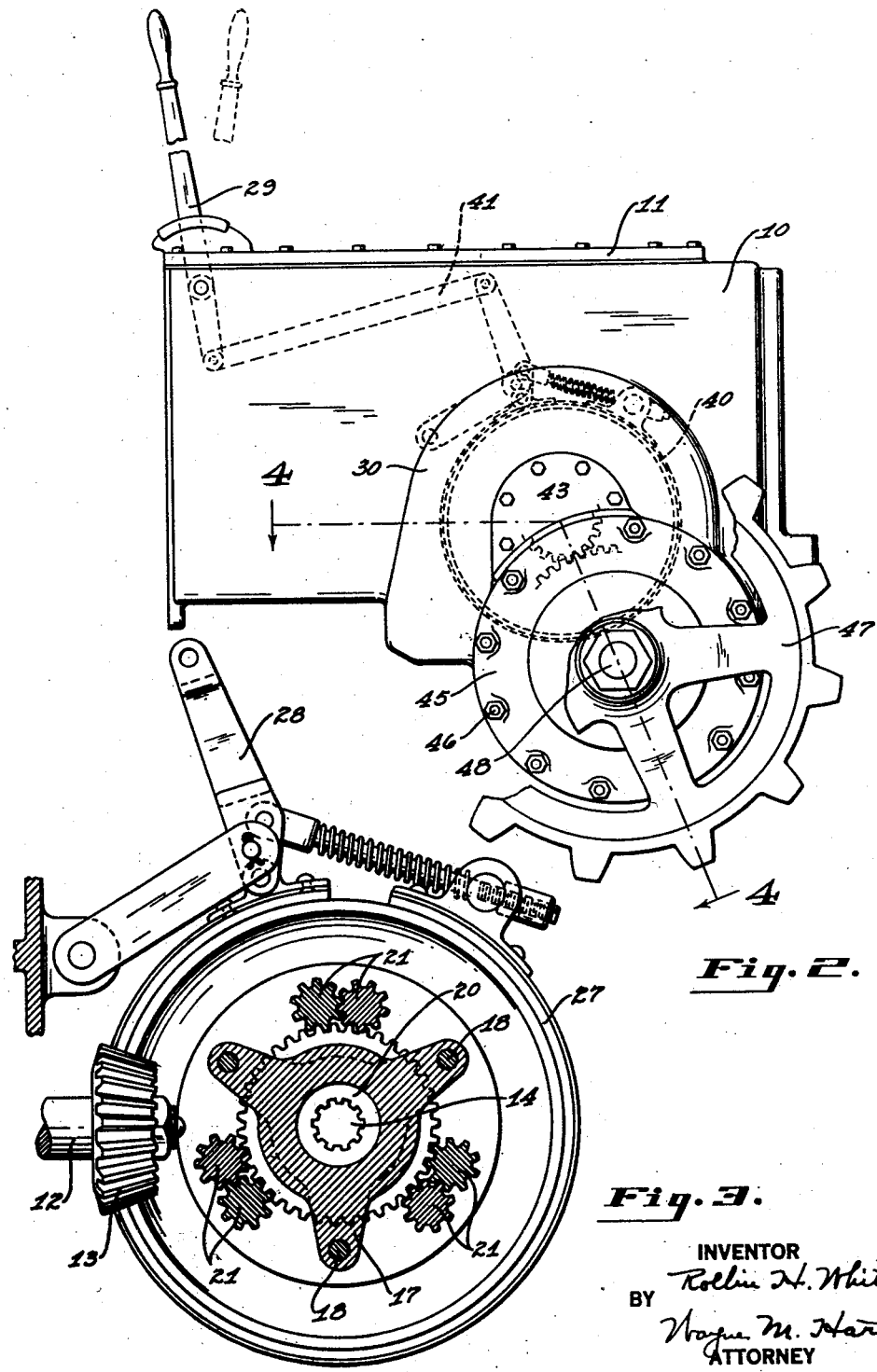

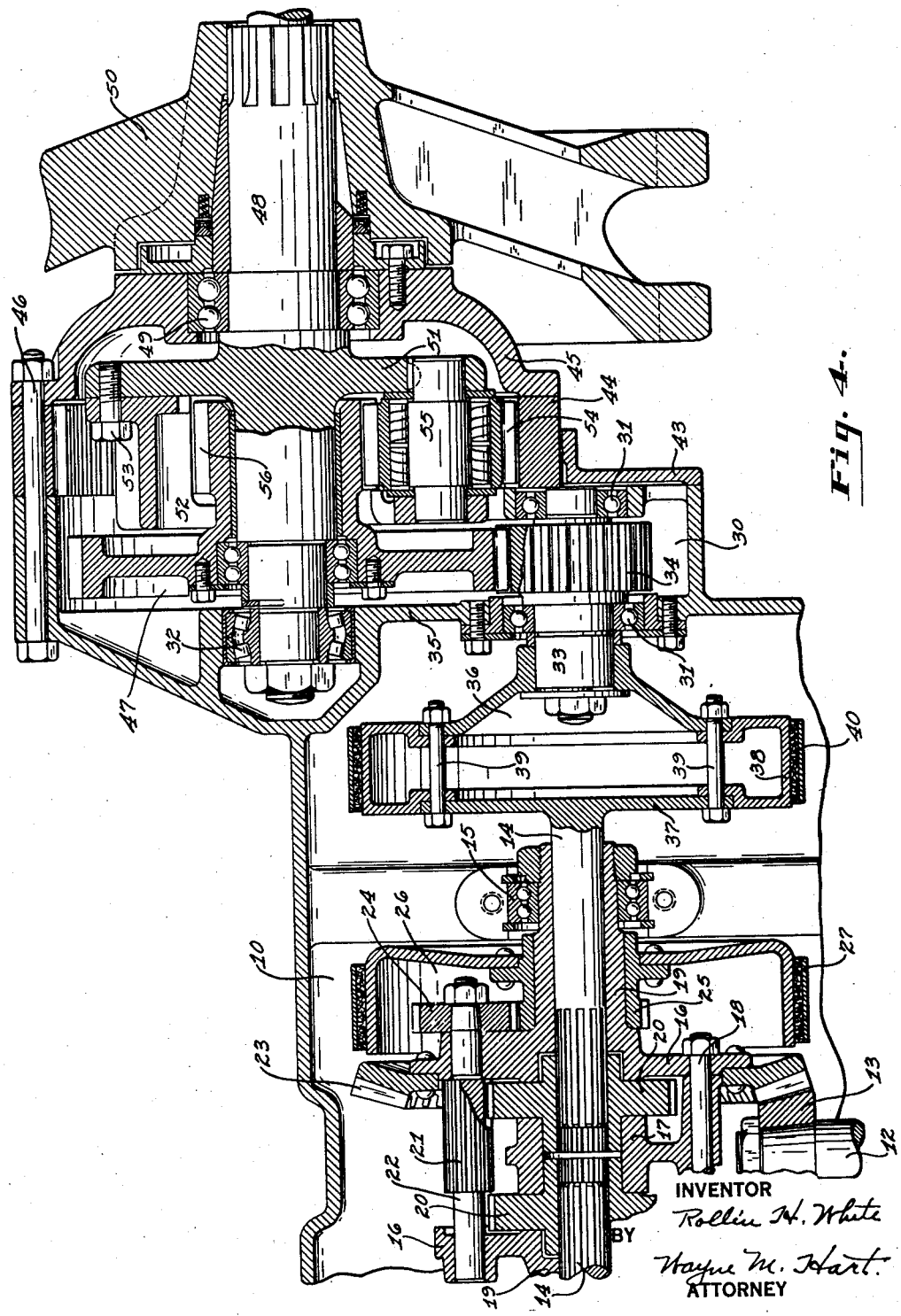

INVENTOR
Rollin H. White
BY Wayne M. Hart
ATTORNEY

Patented Aug. 16, 1932

1,872,541

UNITED STATES PATENT OFFICE

ROLLIN H. WHITE, OF CLEVELAND HEIGHTS, OHIO

TRANSMISSION AND STEERING MECHANISM

Application filed April 19, 1930. Serial No. 445,787.

This invention relates to tractors and more particularly to transmission and steering mechanism.

In tractors of the wheel type and more particularly with tractors of the tracklaying type, it is well known that steering can be readily accomplished through controlling the relative speeds at which the wheels or tracks are driven, and it has been proposed to provide mechanism for turning tractors in a radius in this manner through entirely disconnecting one of the tracks or wheels from the source of power or by varying the rotation of the tracks or wheels relatively without disconnecting the source of power.

With the use of clutches for disconnecting the drive for steering, the entire power is transmitted to the driven track or wheel so that such mechanism is under severe strain, and furthermore, the disconnected side slips under many circumstances thus giving inefficient results. When the power is not disconnected, the turning radius of the tractor is determined by the rotation ratio of the driven members, and thus the turning radius is often greater than that desired for some classes of work.

An object of this invention is to provide a transmission steering mechanism which can be controlled to steer a tractor in an extensive range of radii.

Another object of this invention is to provide a transmission mechanism for tractors which can be controlled to transmit power to only one of the propelling members without disconnecting the mechanism so that the other propelling member will remain stationary.

A further object of the invention is to provide a reduction final drive mechanism for tractors in which is adequately compensated for and at the same time employing only a light weight structure.

Still another object of the invention is to provide a transmission and mounting therefor which is of a relatively light weight and still sufficiently rugged to withstand a severe class of work done while travelling upon all kinds of ground.

Fig. 1 is a plan view, partly broken away, showing the rear end of a tracklaying tractor with the tracks removed.

Fig. 2 is a side elevation of the same.

Fig. 3 is a sectional view taken on line 3—3 of Fig. 1 showing the planetary primary drive mechanism.

Fig. 4 is a sectional view taken on line 4—4 of Fig. 2 showing the entire final drive and steering mechanism for one side of the tractor.

Figure 5:
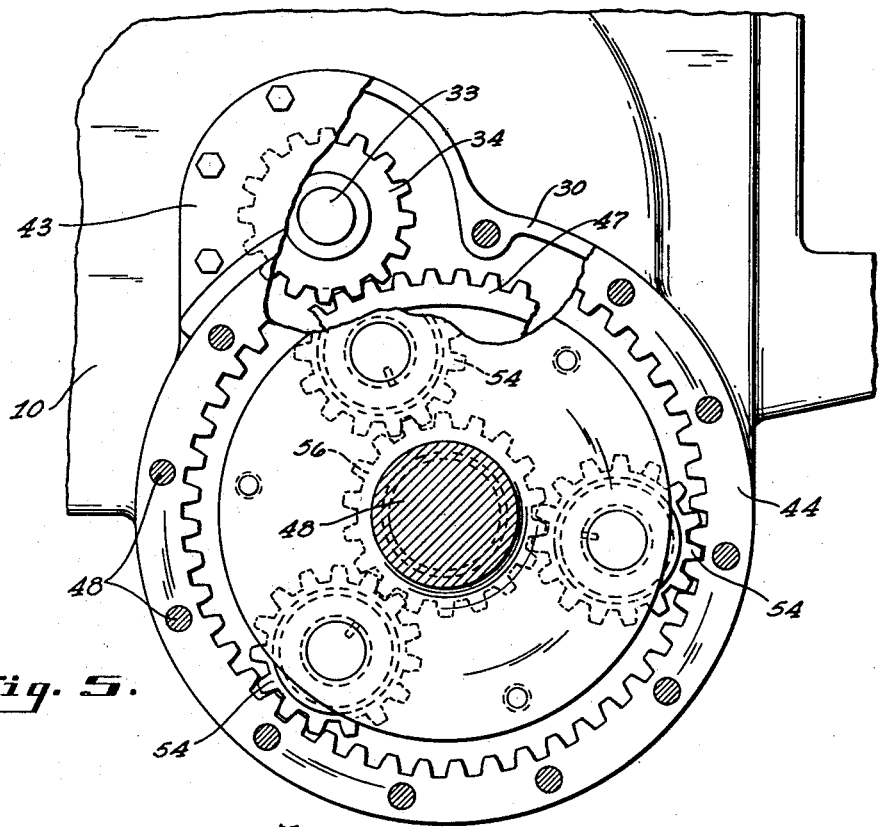
Fig. 5 is a sectional view taken on line 5—5 of Fig. 1 showing the final planetary driving connection.
Figures 6, 7:
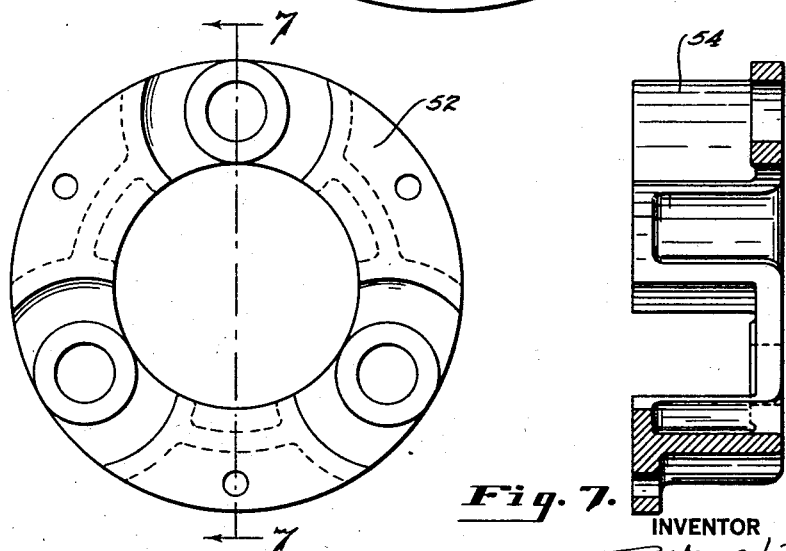
Fig. 6 is a side elevation of the spider for the final reduction drive planetary.
Fig. 7 is a sectional view of the spider taken on line 7—7 of Fig. 6.

Referring now to the drawings by characters of reference, 10 designates the main rear transmission mechanism casing of a tracklaying type of tractor which is formed with an open top closed by the detachable cover 11.

A propeller or drive shaft 12 extends into the transmission housing and is rotated by a suitable source of power, such as an internal combustion engine (not shown), such shaft having a gear 13 fixed to the end thereof associated to drive a differential mechanism of the main planetary type.

The main planetary driven gear is associated with a pair of axially aligned driven shafts 14 which extend through the bearings 15 within the casing. A spider composed of spaced plates 16 and an intermediate collar 17 surround the inner adjacent ends of the driven shafts 14, such plates and collar being secured together by the bolts 18. Formed integrally with the spider plates are sleeves 19 which surround the major portion of the driven shafts 14 and are mounted in the bearings 15. Riveted to one of the spider plates 16 is a bevel gear 23 with which the gear 13 of the drive shaft is arranged in mesh. A gear 20 is keyed to the inner end of each shaft 14 and extend between the ends of the collar 17 and the plates 16. Pairs of meshing planetary gears 21 are carried by parallel shafts 22 which extend transversely through the spider and project through the plates 16, being rotatably mounted relative to the plates. The planetary gears 21 mesh with the gears 20, so that the shafts 14 can be rotated in the same direction but at different speeds relatively or at the same speed during rotation of the spider.

As one means of steering the tractor, I manually control the relative rotation of the driven shafts 14 through mechanism causing a definite rotation of the pairs of planetary gears 21 relative to the rotated spider carrying the same. To this end, I provide similar gears 24 fixed one to the end of each shaft projecting through the spider plates and surround each sleeve 19 with a gear 25 meshing with the gears 24 on each side of the spider. To each of the gears 25 is fixed a drum 26 with which a brake band 27 is associated. Such bands are actuated to engage or to be released through separate link mechanism 28 operated by the levers 29 within convenient reach of the operator riding above the transmission casing.

By holding one of the drums 27, through application of the associated brake band, the gear 25 is held stationary and causing the gear 24 to rotate therearound when the spider is rotated. This rotation of the gear 24 relative to the spider will cause similar rotation of the planetary gear 21 on the same shaft, and the rotation of one of the gears of each pair of meshing planetary gears will cause rotation of the other meshing gear in the opposite direction relative thereto. The gear ratio determine the maximum degree of such relative rotation of the meshing gears of the set of planetary gears, and the gears 20 on the shafts 14 will thus be driven in the same direction but at different speeds, thus steering the tractor in a minimum predetermined radius without disconnecting the drive mechanism.

By slipping the brakes, the gears 25 can be allowed some rotation and thus while still effecting steering, the turning radius can be increased. The application of both bands 27 serves to brake the entire transmission mechanism. Ordinarily neither band is applied, and under such circumstances the shafts 14 rotate at the same speed, as the planetary gears 21 rotate with the spider, and are inactive relatively.

In order to relieve the strain on the heretofore described transmission I provide reduction transmission mechanism, and with such mechanism is arranged an auxiliary steering mechanism of a character such that one of the two driven members imparts no power, without disconnection, and thus allows steering in a smaller radius than by the previously described steering mechanism.

The casing 10 is formed on each slide with an open end extended portion 30 which carry aligned bearings 31 and another bearing 32 forwardly thereof. Stub shafts 33, of more substantial diameter than the shafts 14 and forming continuations thereof, are carried by the bearings 31 and have a pinion 34 fixed thereto exteriorly of the side wall 35 of the casing. Keyed to the inner ends of the stub shafts is a hub 36 which is complementary to a flange 37 formed on the outer end of the adjacent shaft 14. A drum 38 is secured intermediate each of the adjacent hubs and flanges and bolts 39 secure such elements together. A brake band 40 encircles each of the drums and are actuated through the linkages 41 operated by the levers 42 arranged parallel to the levers 29.

Closing an upper opening, adjacent the gear 34, in each of the housing extensions is a plate 43, while a ring gear 44 having internal teeth is held against the open end of the housing extension by the cover 45, bolts 46 extending through such cover, gear and casing extension. The reduction drive is taken from the gears 34 by bull gears 47 each of which is loosely mounted upon a shaft 48 supported by a bearing 32 and a bearing 49 carried by the cover. Such shafts extend through the covers and have fixed thereto the double sprockets 50, for propelling endless track belts (not shown), or round wheels if desired. These shafts it will also be noted are of a diameter considerably greater than the stub shafts 33, as it takes the major torque occurring through the application of power and therefore the shafts 14 can be constructed of relatively light material. It is to also be noted that these shafts 48 are carried by the casing extension and the covers 45 attached thereto so that their mounting is substantially independent of the primary transmission mechanism.

A planetary drive is arranged intermediate each of the bull gears and the shafts 48 for the purposes of relieving torque and for steering. The shafts 48 are formed with a flange 51 to which a spider 52 is secured by the bolts 53. Planetary gears 54 are rotatably mounted upon shafts 55 supported at one end by the inner wall of the spiders and at the other end by the shaft flanges, being keyed to the latter. The bull gears have an extended portion formed with a gear 56 which meshes with the associated planetary gears.

It will be seen that the stub shafts 33 rotate integrally with the shafts 14 and the bull gears 47 are driven by the gears 34 whenever the main transmission is in operation. The gears 56 rotate with the bull gears and drive the shafts 48 through the planetary gears 54 which also mesh with the stationary ring gears 44. Through such mechanism the driving sprockets will have relative differential rotation without affecting the main transmission mechanism, and thus severe strain and torque is not transmitted to the main driving shafts and directly associated mechanism when undue resistance is encountered to the rotation of the sprockets.

When the brake 40 is applied to either of the associated drums, rotation thereof is stopped and the entire driving power is transmitted to the transmission mechanism on the other side of the tractor, while the shaft 48 on the braked side can rotate idly around the ring gear and gear 56.

In this manner steering is accomplished without disconnection of the transmission, the sprocket on the side on which the brake is applied receiving no power permits the tractor to be turned in a minimum radius which is less than the minimum turning radius present when either of the brakes 27 are applied wherein both sprockets are driven but at different speeds. When applying either of the brakes 40, the brakes 27 must be released. Application of both brakes 40 will serve to stop the tractor, just the same as the application of both the brakes 27.

It will be seen that I have provided a rugged reduction drive mechanism as a part of the transmission, and that the tractor can be steered in two radii, one of which turns the tractor in a minimum circle and the other in a larger circle, through a manual control of the transmission mechanism.

Although this invention has been described in connection with certain specific embodiments, the principles involved are susceptible of numerous other applications which will readily occur to persons skilled in the art, and the invention is therefore to be limited only as indicated by the scope of the appended claims.

What I claim is:

1. In a tractor transmission, a drive member, a pair of driven members, a differential gearing driven by said drive member and connected to drive said driven members, means associated with the differential gearing for controlling the relative rotation of said driven members, a constant mesh reduction drive mechanism including planetary gearing driven by each driven shaft, a final drive fixed to a gear of each reduction drive mechanism, and means associated with the driven members for holding them stationary.

2. In a tractor transmission mechanism, a pair of final drive members, a driven differential, reduction mechanism extending intermediate each final drive member and the differential, each reduction mechanism including a planetary gear set and a brake associated with each reduction gearing, the application of the brake stopping rotation of a section of the associated reduction mechanism without disconnecting the driving relation.

3. In a tractor transmission mechanism, a casing having open end extensions, an internal ring gear adjacent each end of the extension, a closure plate covering one end of the ring gear, means securing the plate and ring gear to the open end of each housing, a shaft projecting through each closure plate and supported by the casing, a sprocket fixed to the projecting end of each shaft, reduction gearing in each casing extension driving the shaft therein including planetary gears meshing with the ring gears, and power driven mechanism for actuating the reduction gearing.

4. In a tractor transmission mechanism, a casing having an open extension on each side, a closure plate secured to each open extension, driven shafts, and final drive mechanism casing extension supported therein and driven by the shafts comprising a shaft journalled to the casing and closure plate, a sprocket fixed to the shaft end extending through the closure plate, and constant mesh reduction gearing supported by and fixed to the shaft including planetary gears.

5. In a tractor transmission mechanism, a casing having an open extension, a closure plate secured to each open extension, primary driven shafts extending into the casing extensions, a final drive shaft journalled in each casing and extending through the closure plate thereof, a sprocket fixed to each final drive shaft exteriorly of the casing, a spider fixed to each shaft in its casing, planetary gears carried by the shaft and spider, a gear driven by the primary shaft in each casing extension and meshing with the planetary gears, said gear being rotatable on the shaft in the housing extension, and a stationary ring gear in each housing with which the planetary gears therein mesh.

6. In a tractor transmission mechanism, a casing having an open extension, a closure plate secured to each open extension, primary driven shafts extending into the casing extensions, a final drive shaft journalled in each casing and extending through the closure plate thereof, a sprocket fixed to each final drive shaft exteriorly of the casing, a spider fixed to each shaft in its casing, planetary gears carried by the shaft and spider, a gear driven by the primary shaft in each casing extension and meshing with the planetary gears, said gear being rotatable on the shaft in the housing extension, and a stationary ring gear in each housing with which the planetary gears therein mesh and means for holding the primary shafts stationary.

7. In a tractor transmission mechanism, a casing having an open extension on each side, a closure plate secured to each open extension, driven shaft, and final drive mechanism supported in each open extension and driven by the shafts comprising a shaft journalled to the casing and closure plate, a sprocket fixed to the said shaft end, reduction gearing supported by the said shaft including planetary gears and means for holding the differential drive stationary.

8. In a tractor transmission mechanism, a driven differential, a pair of final drive units including a sprocket, a shaft intermediate the differential and each final drive unit, said shafts each including spaced sections and an intermediate drum, and brake mechanism adapted to engage the drums.

9. In a tractor transmission mechanism, a driven differential, a pair of final drive units including a sprocket, and a sectional shaft intermediate each final drive unit and the differential, each of said shafts including spaced aligned sections having the adjacent ends formed with a transversely extending extension, and a drum secured between the extensions.

In testimony whereof, I hereto sign my name.

ROLLIN H. WHITE.